United States Patent
Newberg et al.

(10) Patent No.: US 8,588,210 B2
(45) Date of Patent: Nov. 19, 2013

(54) METHOD AND APPARATUS FOR FLOOR CONTROL IN A COMMUNICATION SYSTEM

(75) Inventors: Donald G. Newberg, Hoffman Estates, IL (US); Tyrone D. Bekiares, Chicago, IL (US); Matthew C. Keller, Algonquin, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1819 days.

(21) Appl. No.: 11/196,942

(22) Filed: Aug. 4, 2005

(65) Prior Publication Data
US 2007/0036093 A1    Feb. 15, 2007

Related U.S. Application Data

(60) Provisional application No. 60/702,037, filed on Jul. 22, 2005.

(51) Int. Cl.
 *H04L 12/66* (2006.01)
 *H04M 3/42* (2006.01)
 *H04B 7/00* (2006.01)

(52) U.S. Cl.
 USPC ........... 370/352; 370/353; 370/354; 370/355; 370/356; 455/416; 455/518; 455/519

(58) Field of Classification Search
 USPC .......... 370/352–356, 260–261; 455/416, 518, 455/519; 709/204–207, 227–229
 See application file for complete search history.

(56) References Cited

U.S. PATENT DOCUMENTS

| | | | |
|---|---|---|---|
| 5,434,852 | A | 7/1995 | La Porta et al. |
| 5,517,494 | A | 5/1996 | Green |

(Continued)

FOREIGN PATENT DOCUMENTS

| | | |
|---|---|---|
| EP | 1 282 322 B1 | 7/2002 |
| EP | 1248431 A1 | 10/2002 |

(Continued)

OTHER PUBLICATIONS

Koskelainen, P., Ott, J., Schulzrinne, H., Wu, X., "Requirements for Floor Control Protocol" draft-ietf-xcon-floor-control-req-03.txt, Jan. 2, 2005. Website address: http://www.ietf.org/internet-drafts/draft-ietf-xcon-floor-control-req-03.txt.

(Continued)

*Primary Examiner* — Luat Phung
*Assistant Examiner* — Kai Chang
(74) *Attorney, Agent, or Firm* — Steven A. May; Randi L. Karpinia (57) ABSTRACT

Methods for enabling floor control are performed in an endpoint terminal (140, 142, 146) and a session controller (106). The session controller: receives (410) a message requesting a session that includes an SDP packet with a requested floor control profile having a requested set of floor control parameters or a requested list of potential floor owners; accepts (410) the session; determines (420) a final floor control profile having a final set of floor control parameters and a final list of potential floor owners; and communicates at least a portion of the floor control profile within a system (100). The endpoint terminal: communicates a message requesting a session that includes an SDP packet with a requested floor control profile; and receives a message having an SDP packet with a final floor control parameter. The final floor control profile may be the same as or different from the requested floor control profile.

19 Claims, 4 Drawing Sheets

(56) References Cited

U.S. PATENT DOCUMENTS

| | | |
|---|---|---|
| 5,774,673 A | 6/1998 | Beuk et al. |
| 5,835,723 A | 11/1998 | Andrews et al. |
| 5,928,331 A | 7/1999 | Bushmitch |
| 6,005,848 A | 12/1999 | Grube et al. |
| 6,026,296 A | 2/2000 | Sanders |
| 6,108,705 A | 8/2000 | Svennevik et al. |
| 6,275,852 B1 | 8/2001 | Filepp et al. |
| 6,301,245 B1 | 10/2001 | Luzeski et al. |
| 6,304,558 B1 | 10/2001 | Mysore |
| 6,349,097 B1 | 2/2002 | Smith |
| 6,385,198 B1 | 5/2002 | Ofek et al. |
| 6,438,114 B1* | 8/2002 | Womack et al. ............ 370/329 |
| 6,449,260 B1 | 9/2002 | Sassin et al. |
| 6,477,150 B1 | 11/2002 | Maggenti et al. |
| 6,483,832 B1 | 11/2002 | Civanlar et al. |
| 6,505,253 B1 | 1/2003 | Chiu et al. |
| 6,507,562 B1 | 1/2003 | Kadansky et al. |
| 6,529,882 B1 | 3/2003 | Park et al. |
| 6,567,851 B1 | 5/2003 | Kobayashi |
| 6,587,684 B1 | 7/2003 | Hsu et al. |
| 6,611,872 B1 | 8/2003 | McCanne |
| 6,728,748 B1 | 4/2004 | Mangipudi et al. |
| 6,798,755 B2 | 9/2004 | Lillie et al. |
| 6,798,780 B1 | 9/2004 | Dan et al. |
| 6,823,364 B1 | 11/2004 | Sollee et al. |
| 6,845,389 B1 | 1/2005 | Sen et al. |
| 6,898,423 B2 | 5/2005 | Motegi et al. |
| 6,934,279 B1 | 8/2005 | Sollee et al. |
| 6,965,614 B1 | 11/2005 | Osterhout et al. |
| 6,985,961 B1 | 1/2006 | Ramsayer et al. |
| 7,023,813 B2 | 4/2006 | Newberg et al. |
| 7,031,700 B1* | 4/2006 | Weaver et al. ............ 455/420 |
| 7,079,495 B1 | 7/2006 | Pearce et al. |
| 7,170,863 B1* | 1/2007 | Denman et al. ............ 370/260 |
| 7,343,254 B2 | 3/2008 | Otusuka et al. |
| 7,366,780 B2 | 4/2008 | Keller et al. |
| 7,502,837 B2 | 3/2009 | Westman et al. |
| 7,783,310 B2 | 8/2010 | Rana et al. |
| 7,936,680 B2 | 5/2011 | Osswald |
| 7,970,426 B2 | 6/2011 | Poe et al. |
| 8,078,730 B2 | 12/2011 | Travostino |
| 2001/0027111 A1 | 10/2001 | Motegi et al. |
| 2002/0035602 A1 | 3/2002 | Garcia-Luna-Aceves et al. |
| 2002/0037735 A1 | 3/2002 | Maggenti et al. |
| 2002/0061760 A1 | 5/2002 | Maggenti et al. |
| 2002/0061761 A1 | 5/2002 | Maggenti et al. |
| 2002/0061762 A1 | 5/2002 | Maggenti et al. |
| 2002/0073208 A1 | 6/2002 | Wilcock et al. |
| 2002/0077136 A1 | 6/2002 | Maggenti et al. |
| 2002/0086665 A1 | 7/2002 | Maggenti et al. |
| 2002/0098840 A1 | 7/2002 | Hanson |
| 2002/0119821 A1 | 8/2002 | Sen et al. |
| 2002/0141383 A1 | 10/2002 | Schaefer et al. |
| 2002/0150091 A1 | 10/2002 | Lopponen et al. |
| 2002/0150092 A1 | 10/2002 | Bontempi et al. |
| 2002/0156903 A1 | 10/2002 | Corneliussen |
| 2002/0177466 A1 | 11/2002 | Laurila et al. |
| 2002/0184373 A1* | 12/2002 | Maes ............ 709/228 |
| 2003/0079037 A1 | 4/2003 | Donnelly et al. |
| 2003/0095510 A1 | 5/2003 | Dorenbsoch |
| 2003/0115283 A1 | 6/2003 | Barbir et al. |
| 2003/0152040 A1* | 8/2003 | Crockett et al. ............ 370/260 |
| 2003/0227899 A1 | 12/2003 | McCann |
| 2003/0235184 A1* | 12/2003 | Dorenbosch et al. ...... 370/352 |
| 2004/0057405 A1 | 3/2004 | Black |
| 2004/0125760 A1 | 7/2004 | Newberg et al. |
| 2004/0125802 A1 | 7/2004 | Lillie et al. |
| 2004/0131042 A1* | 7/2004 | Lillie et al. ............ 370/351 |
| 2004/0131060 A1 | 7/2004 | Newberg et al. |
| 2004/0133683 A1 | 7/2004 | Keller et al. |
| 2004/0139088 A1 | 7/2004 | Mandato et al. |
| 2004/0174830 A1* | 9/2004 | Koskelainen et al. ...... 370/260 |
| 2004/0190489 A1* | 9/2004 | Palaez et al. ............ 370/351 |
| 2005/0105511 A1* | 5/2005 | Poikselka ............ 370/352 |
| 2005/0124365 A1* | 6/2005 | Balasuriya et al. ........ 455/518 |
| 2005/0143135 A1* | 6/2005 | Brems et al. ............ 455/564 |
| 2005/0169223 A1 | 8/2005 | Crocker et al. |
| 2006/0045043 A1 | 3/2006 | Crocker |
| 2006/0047820 A1* | 3/2006 | Sung et al. ............ 709/227 |
| 2006/0058052 A1* | 3/2006 | Plestid et al. ............ 455/519 |
| 2006/0116149 A1* | 6/2006 | Dunn et al. ............ 455/518 |
| 2006/0121924 A1* | 6/2006 | Rengaraju et al. ........ 455/518 |
| 2006/0153102 A1* | 7/2006 | Kuure et al. ............ 370/263 |
| 2006/0229094 A1* | 10/2006 | Huh et al. ............ 455/518 |
| 2007/0105578 A1 | 5/2007 | Shaffer et al. |
| 2008/0120364 A1 | 5/2008 | Chari et al. |
| 2008/0168172 A1 | 7/2008 | Keller et al. |
| 2010/0284720 A1 | 11/2010 | Hayashi |

FOREIGN PATENT DOCUMENTS

| | | |
|---|---|---|
| GB | 2 366 477 A | 8/2000 |
| JP | 61-135269 A | 6/1986 |
| JP | 63-211940 A | 9/1988 |
| JP | 05-227303 A | 3/1993 |
| JP | 08-292923 A | 5/1996 |
| JP | 09-284210 A | 10/1997 |
| JP | 10-154980 A | 6/1998 |
| JP | 10-285281 A | 10/1998 |
| JP | 11065976 A | 3/1999 |
| JP | 2001145136 A | 5/2001 |
| JP | 2001320536 A | 11/2001 |
| JP | 2001-346267 A | 12/2001 |
| JP | 2001339592 A | 12/2001 |
| JP | 2001352341 A | 12/2001 |
| JP | 2005308634 A | 11/2005 |
| WO | 01/67674 A2 | 9/2001 |
| WO | 01/67675 A2 | 9/2001 |
| WO | 01/67787 A2 | 9/2001 |
| WO | 02/093953 A1 | 11/2002 |
| WO | 2004062173 A3 | 3/2005 |

OTHER PUBLICATIONS

"SIP: FAQ". Website address: http://www.egyed.com/faq/sip_faq.html.
Handley, M., Jacobson, V., "SDP: Session Description Protocol", Apr. 1998. Website address: http://www.faqs.org/rfcs/rfc2327.html.
PCT Search Report Dated Dec. 26, 2006.
PCT Search Report Dated Apr. 20, 2004 for Related U.S. Appl. No. 10/334,521.
EPC Search Rejection Dated Oct. 9, 2006 for Related U.S. Appl. No. 10/334,521.
US Office Action Dated Dec. 28, 2006 for Related U.S. Appl. No. 10/334,521.
Japanese Office Action Dated Apr. 18, 2007 for Related U.S. Appl. No. 10/334,521.
US Office Action Dated May 14, 2007 for Related U.S. Appl. No. 10/334,521.
US Advisory Action Dated Aug. 1, 2007 for Related U.S. Appl. No. 10/334,521.
EPC Office Action Dated Oct. 25, 2007 for Related U.S. Appl. No. 10/334,521.
Canadian Office Action Dated Dec. 30, 2008 for Related U.S. Appl. No. 10/334,521.
Japanese Office Action Dated Sep. 9, 2008 for Related U.S. Appl. No. 10/334,521.
Handley, et al., "SIP—Session Initiation Protocol," Internet Engineering Task Force (IETF), Mar. 1999.
Hayden, "LAN Addressing for Digital Video Data," Digital Equipment Corporation, Digital technical Journal, Spring 1993, vol. 5, Issue 2, pp. 77-83.
OSO/OSI Network Model Document, pp. 1-2.
RFC 2068 Hypertext Transfer Protocol—HTTP/1.1, pp. 1, 9-10.
Korean Letters Patent Dated Dec. 2009.
German Office Action—English Translation Dated Apr. 2010.
Decision to Grant for related European Application No. 03814887.0 mailed on Sep. 1, 2011.
English translation of Notice of Allowance for related Japanese Patent Application No. 2004-565605 mailed on Sep. 3, 2009.

(56) References Cited

OTHER PUBLICATIONS

English translation of Office Action for counterpart Korean Patent Application No. 10-2008-7001604 mailed on Mar. 23, 2009.
English translation of Office Action for related Israel Application No. 169234 mailed on Aug. 3, 2009.
English translation of Office Action for related Japanese Patent Application No. 2004-565605 mailed on Feb. 3, 2009.
English translation of Office Action for related Japanese Patent Application No. 2004-565606 mailed on Feb. 6, 2007.
English translation of Office Action for related Japanese Patent Application No. 2004-565606 mailed on Feb. 16, 2010.
English translation of Office Action for related Japanese Patent Application No. JP 2004-565567 dated Jul. 20, 2010.
Rosenberg, J., et al., "SIP: Session Initiation Protocol," Network Working Group, RFC 3261, Jun. 2002, 252 pages.
European Search Report for related European Patent Application No. 03 814 886.2 mailed on May 15, 2012.
Final Office Action mailed Jul. 31, 2007 in related U.S. Appl. No. 10/334,577, Matthew Keller, filed Dec. 31, 2002.
Final Office Action mailed Jun. 23, 2005 in related U.S. Appl. No. 10/334,439, Donald G. Newberg, filed Dec. 31, 2002.
Final Office Action mailed Jun. 28, 2011 in related U.S. Appl. No. 12/046,251, Matthew Keller, filed Mar. 11, 2008.
Final Office Action mailed May 17, 2006 in related U.S. Appl. No. 10/334,439, Donald G. Newberg, filed Dec. 31, 2002.
International Preliminary Report on Patentability and Written Opinion for counterpart International Application No. PCT/US2006/021462 mailed on Jan. 31, 2008.
International Search Report for related International Application No. PCT/US2003/40464 mailed on Dec. 9, 2004.
International Search Report for related International Application No. PCT/US2003/40697 mailed on Apr. 21, 2004.
International Search Report for related International Application No. PCT/US2003/40694 mailed on Nov. 8, 2004.
International Search Report for related International Application No. PCT/US2003/40696 mailed on Oct. 13, 2004.
Non Final Office Action mailed Dec. 14, 2004 in related U.S. Appl. No. 10/334,439, Donald G. Newberg, filed Dec. 31, 2002.
Non Final Office Action mailed Jan. 25, 2005 in related U.S. Appl. No. 10/334,635, Donald G. Newberg, filed Dec. 31, 2002.
Non Final Office Action mailed Jan. 26, 2007 in related U.S. Appl. No. 10/334,577, Matthew Keller, filed Dec. 31, 2002.
Non Final Office Action mailed Mar. 22, 2010 in related U.S. Appl. No. 12/046,251, Matthew Keller, filed Mar. 11, 2008.
Non Final Office Action mailed May 2, 2007 in related U.S. Appl. No. 10/334,439, Donald G. Newberg, filed Dec. 31, 2002.
Non Final Office Action mailed Oct. 26, 2005 in related U.S. Appl. No. 10/334,439, Donald G. Newberg, filed Dec. 31, 2002.
Notice of Allowance for related Canadian Application No. 2510629 mailed on Jan. 14, 2008.
Notice of Allowance for related Canadian Patent Application No. 2510622 mailed on Mar. 16, 2009.
Notice of Allowance for related Canadian Patent Application No. 2510631 mailed on Jul. 29, 2011.
Notice of Allowance for related Canadian Patent Application No. 2511937 mailed on May 26, 2009.
Notice of Allowance for related European Application No. 03814887.0 mailed on Apr. 4, 2011.
Notice of Allowance mailed Aug. 26, 2005 in related U.S. Appl. No. 10/334,635, Donald G. Newberg, filed Dec. 31, 2002.
Notice of Allowance mailed Dec. 12, 2007 in related U.S. Appl. No. 10/334,577, Matthew Keller, filed Dec. 31, 2002.
Notice of Allowance mailed Dec. 31, 2007 in related U.S. Appl. No. 10/334,439, Donald G. Newberg, filed Dec. 31, 2002.
Notice of Allowance mailed Mar. 19, 2012 in related U.S. Appl. No. 12/046,251, Matthew Keller, filed Mar. 11, 2008.
Notice of Allowance mailed on Jan. 10, 2011 in related U.S. Appl. No. 10/334,521, Ross J Lillie, Dec. 31, 2002.
Notice of Allowance mailed on Nov. 2, 2012 in related U.S. Appl. No. 12/046,251, Matthew Keller, filed Mar. 11, 2008.
Notice of Allowance mailed on Sep. 20, 2010 in related U.S. Appl. No. 10/334,521, Ross J. Lillie, filed Dec. 31, 2002.
Office Action for related Canadian Patent Application No. 2510622 mailed on Apr. 28, 2008.
Office Action for related Canadian Patent Application No. 2510629 mailed on Dec. 18, 2006.
Office Action for related Canadian Patent Application No. 2510631 mailed on Dec. 19, 2008.
Office Action for related Canadian Patent Application No. 2510631 mailed on May 17, 2010.
Office Action for related Canadian Patent Application No. 2511937 mailed on Oct. 14, 2008.
Office Action for related European Application No. 03814886.2 mailed on Aug. 8, 2012.
Office Action for related European Patent Application No. 03799997.6 mailed on Sep. 30, 2010.
Office Action for related European Patent Application No. 03814887.0 mailed on Feb. 18, 2010.
Office Action for related European Patent Application No. 03814888.8 dated Oct. 25, 2007.
Office Action for related European Patent Application No. 03814888.8 mailed on Jun. 1, 2012.
Supplementary European Search Report for related Application No. 03814888.8 mailed on May 9, 2006.
Supplementary European Search Report for related European Application No. 03799997.6 mailed on Jun. 9, 2010.
Supplementary European Search Report for related European Application No. 03814887.0 mailed on Nov. 9, 2009.
Cohen, R., "Video-on-Demand Session Management," IEEE Journal on Selected Areas in Communications, vol. 14, No. 6, Aug. 1996, pp. 1151-1161.
Handley, M., et al., "Session Announcement Protocol," Network Working Group, RFC 2974, Oct. 2000, 17 pages.
Roach, A. B., Session Initiation Protocol (SIP)—Specific Event Notification, Network Working Group, RFC 3265, Jun. 2002, 36 pages.
Rosenberg, J., et al., "An Application Server Component Architecture for SIP," Internet Engineering Task Force Internet Draft, Mar. 2, 2001, 38 pages.
Rosenberg, J., et al., "Models for Multi Party Conferencing in SIP," Dynamic Soft, Internet Engineering Task Force, Internet Draft, Jul. 20, 2001, 26 pages.
Rosenberg, J., et al., "Models for Multi Party Conferencing in SIP" Dynamic Soft, Internet Engineering Task Force, Internet Draft, Nov. 17, 2000, 21 pages.
European Search Report for related European Patent Application No. 12186379.9 mailed on Jan. 28, 2012.
Ott, J.,et al., "Capability description for group cooperation," draft-ott-mmusic-cap-00.txt., Internet-Draft, Jun. 1999, 22 pages.
Trossen D., "Conference Course Control Problem Statement," draft-trossen-conferencing-problem-00.txt., Internet Engineering Task Force, Nov. 6, 2001, 14 pages.

* cited by examiner

FIG. 5

METHOD AND APPARATUS FOR FLOOR CONTROL IN A COMMUNICATION SYSTEM

REFERENCE TO RELATED APPLICATIONS

The present application claims the benefit of U.S. Provisional Application No. 60/702,037, filed Jul. 22, 2005.

The present application is related to the following U.S. applications commonly owned together with this application by Motorola, Inc.:

Ser. No. 10/334,635, filed Dec. 31, 2002, titled "Methods for Managing a Pool of Multicast Addresses and Allocating Addresses in a Communications System" by Newberg, et al.;

Ser. No. 10/334,523, filed Dec. 31, 2002, titled "Apparatus and Method for Controlling and Managing Individual Directed Sessions in a Communications System" by Lillie, et al.;

Ser. No. 10/334,439, filed Dec. 31, 2002, titled "Methods for Affiliating Endpoints with a Group and Determining Common Communication Capabilities for the Affiliated Endpoints" by Newberg, et al.;

Ser. No. 10/334,577, filed Dec. 31, 2002, titled "System and Method for Controlling and Managing Sessions Between Endpoints in a Communications System" by Newberg, et al.; and Ser. No. 10/334,521, filed Dec. 31, 2002, titled "Method and System for Group Communication" by Lillie, et al.

FIELD OF THE INVENTION

The present invention relates generally to a method and apparatus for floor control in a communication system.

BACKGROUND OF THE INVENTION

Multimedia and group communications have become an important aspect of telecommunications, and the demand for such continues to increase. For instance, the Final Report of the Public Safety Wireless Advisory Committee to the Federal Communications Committee ("FCC"), dated 1996, expressed the critical need for communication resources for multimedia. Subsequently in 1998, the FCC established a band plan for the 764 MHz frequencies that included spectrum set aside for public safety wideband. In addition, the Internet Engineering Task Force ("IETF") has developed a suite of protocols that are designed for use in multimedia communications. These protocols include a Session Initiation Protocol ("SIP"), for instance as described in the IETF Request for Comment ("RFC") 3261, a Session Announcement Protocol ("SAP"), for instance as described in RFC 2974, and a Session Description Protocol ("SDP"), for instance as described in RFC 2327.

Since its approval in early 1999 as an official standard, SIP has gained tremendous market acceptance for signaling communications services on the Internet. As such, numerous products incorporate the SIP standard, including but not limited to SIP desktop telephones, SIP telephony servers, and personal computing ("PC") devices running SIP applications. SIP is a text-based signaling transactional protocol, similar to Hypertext Transfer Protocol ("HTTP") and Simple Mail Transfer Protocol ("SMTP"), and works in the Application layer of the Open Systems Interconnection ("OSI") communications model. A SIP message is used for call control, e.g., to control interactive communications sessions or calls, such as voice, video, and chat, between users (also referred to herein as callers) in a communications network. Each user is typically associated with a communications device (also referred to herein as a terminal device) that is connected to the network.

SIP was designed for controlling media sessions and for establishing media sessions between an initiating endpoint and one recipient endpoint or a group of recipient endpoints. Moreover, for communications between a group of endpoints, there are typically limited shared resources for transmitting and receiving media. Therefore, communication systems may accordingly implement some form of floor control to control access to those limited resources at any given time. It is known to use separate protocols for call control and floor control. However, a problem with this approach is that it requires two separate message exchanges during call set-up (i.e., one for the session and one for the floor) in order to start communications. This can cause an undesired delay in call set-up as both message exchanges need to complete in order to begin transmitting and receiving media.

Thus, what is needed is a method and apparatus to describe a floor control profile that corresponds to a given session that may be dynamically assigned for each session, and to associate floor control parameters with a specific session and media stream(s) at call initiation to minimize call set-up times. It is further desirable that at call set-up communication resources are only reserved for callers that will be sourcing media during a session.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

Before describing in detail embodiments that are in accordance with the present invention, it should be observed that the embodiments reside primarily in combinations of method steps and apparatus components related to a method and apparatus for floor control in a communication system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for floor control in a communication system described herein. The non-processor circuits may include, but are not limited to, a radio receiver, a radio transmitter, signal drivers, clock circuits, power source circuits, and user input devices. As such, these functions may be interpreted as steps of a method to perform the floor control described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, methods and apparatus for establishing floor control parameters at call set-up or during a call are described. Implementation of these various embodiments enable the use of separate protocols for call control and floor control during a session while concurrently enabling a dynamic assignment of a floor control profile on a session by session basis and minimizing call set-up times by eliminating the need for separate message sequences to establish the call control and floor control parameters corresponding to the session. Further described are methods for allocating resources only to the endpoints that may potentially source media during a session in order to further preserve available limited communication resources. Those skilled in the art will realize that the above recognized advantages and other advantages described herein are merely exemplary and are not meant to be a complete rendering of all of the advantages of the various embodiments of the present invention.

Figure 1:
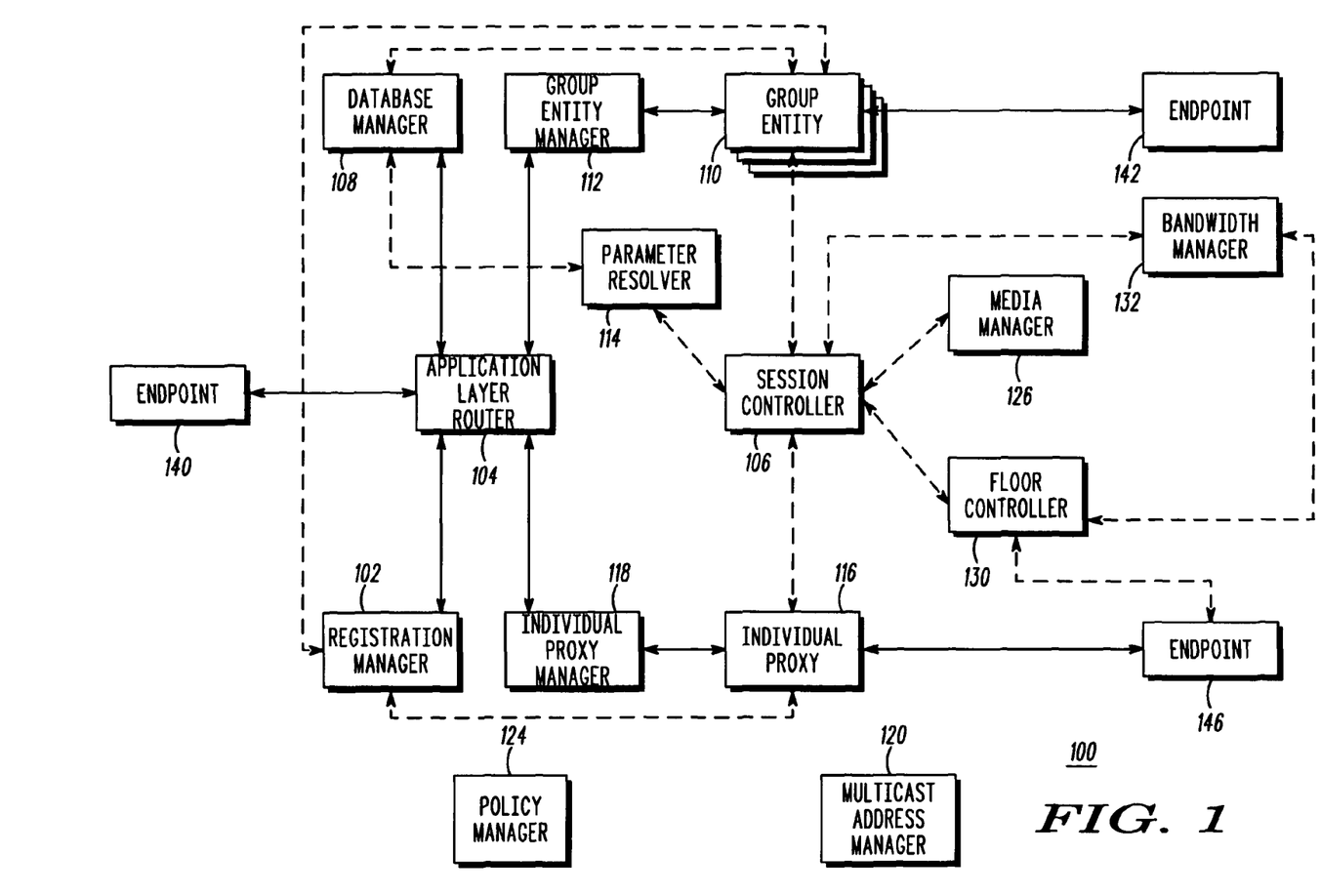
FIG. 1 illustrates a block diagram of a call model architecture for implementing embodiments of the present invention.

Referring now to the drawings, and in particular FIG. 1, an exemplary call control model architecture for implementing embodiments of the present invention is shown and indicated generally at 100. Those skilled in the art, however, will recognize and appreciate that the specifics of this illustrative example are not specifics of the invention itself and that the teachings set forth herein are applicable in a variety of alternative settings. For example, since the teachings described do not depend on the particular call model architecture and call control protocols, they can be applied to various types of call models and call control protocols. As such, other alternative implementations of using different types of call model architectures and call control protocols are contemplated and are within the scope of the various teachings described.

Call control architecture 100 comprises a number of entities and their communication paths for enabling communications between at least two endpoints (e.g., 140, 142, and 146) in a communications system. Each endpoint typically comprises a logical entity, e.g., a user, and a physical counterpart, e.g., a terminal. Entities connected with solid black lines communicate using a transactional protocol or a broadcast protocol. A transactional protocol that may be implemented in call control architecture 100 is SIP, a broadcast protocol that may be implemented is SAP, and a communication description protocol that may be implemented is SDP. Other transactional, broadcast and/or communication description protocols may be implemented. Other entities connected with dashed lines communicate using appropriate protocols that may be proprietary or known in the art. Architecture 100 may be used, for instance, for time critical communications systems such as public safety dispatch systems.

For enabling group communications between at least two endpoints (e.g., endpoints 140 and 142) architecture 100 comprises a session controller 106, a group database manager 108, and at least one group entity 110 that is named and addressable at the application layer. To further facilitate application layer routing, architecture 100 may comprise a registration manager 102 and an application layer router 104 that may be a SIP proxy. Architecture 100 finally may also include a group entity manager 112, a parameter resolver 114, at least one individual proxy 116, an individual proxy manager 118, a multicast address manager 120, a policy manager 124, a floor controller 130, a media manager 126, and a bandwidth manager 132. Architecture 100 is simplified for purposes of illustrating the present invention. However, those of ordinary skill in the art will realize that architecture 100 may include a plurality of each illustrated entity as a function of the size of the system. Moreover, fewer or more endpoints than is shown in FIG. 1 may use architecture 100 to communicate.

Figure 2:
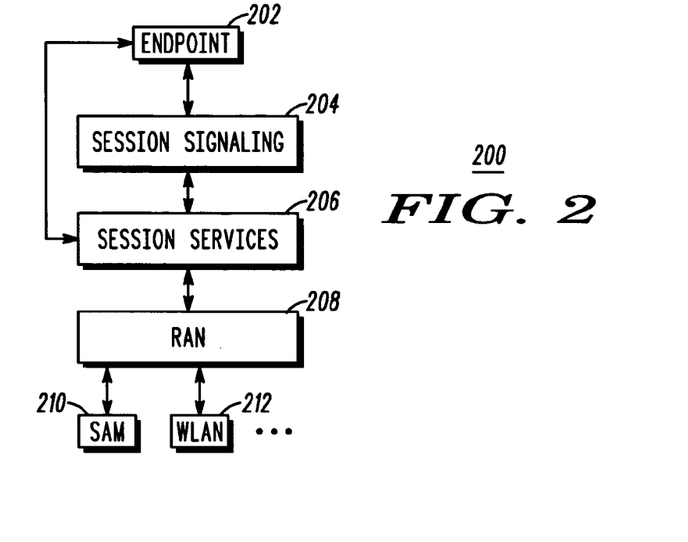
FIG. 2 illustrates a layered view of the call model architecture illustrated in FIG. 1.

Architecture 100 is configured to be independent of an underlying network and air interface and relies on entities such as the bandwidth manager 132 for network specific functionality. Architecture 100 can be viewed as being abstracted into three layers as shown in FIG. 2: a session signaling layer 204; a session services layer 206; and a Radio Access Network (RAN) layer 208. The session signaling layer 204 terminates session control signaling such as SIP, SAP, and SDP that may be used in combination to initiate, modify, and terminate sessions. The session signaling layer 204 further makes requests into and receives events, e.g., lack of bandwidth, from the session services layer 206. The session services layer 206 provides session services such as session interaction for prioritization and preemption and for features such as critical users. The session services layer 206 further enforces system policies such as allowing a user or a group to make a certain call type or to use a certain amount of bandwidth, and also provides in-session services such as floor control or media management services (e.g. transcoding) directly to an endpoint, e.g., endpoint 202. The RAN layer 208 is aware of underlying wireline and/or wireless network implementations, e.g., a SAM (Scalable Adaptive Modulation) 210 and a Wireless Local Area Network (WLAN) 212, and provides network specific functionality to support the session services layer 206. This functionality may include bandwidth management for the various wired and wireless links and location management of the terminals in the system.

The layered view 200 is beneficial in that each of the layers can be modified independently of the other layers. For instance, the session signaling layer 204 could be changed without affecting the other layers, for example, if use of a different call control protocol is desired. Moreover, such a layered approach enables architecture 100 to support various air interfaces and mobility schemes without affecting the session services or session signaling.

Figure 3:
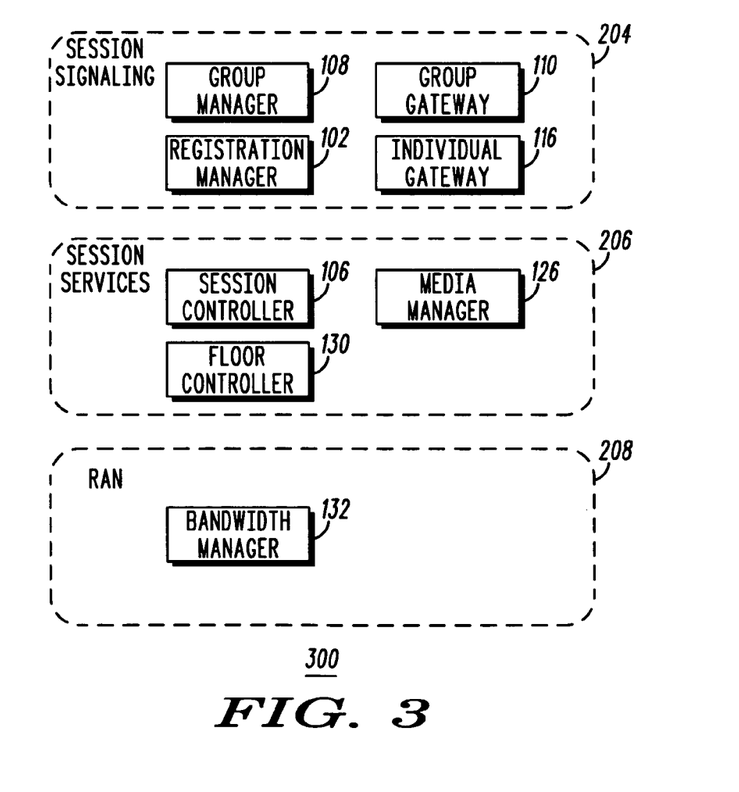
FIG. 3 further illustrates the layered view of the call model architecture illustrated in FIG. 1.

FIG. 3 further illustrates the layered view 200 of architecture 100 as well as the allocation of the components of the architecture 100 to the various layers. The registration manager 102, group database manager 108, group entity or gateway 110, and individual proxy or gateway 116 are allocated to the session signaling layer 204. The session controller 106, media manager 126 and floor controller 130 are allocated to the session services layer 206, and the bandwidth manager 132 is allocated to the RAN layer 208. The interfaces between the session controller 106 and the individual proxy 116, group entity 110, and bandwidth manager 132 may provide flexibility to accommodate systems that use different RANs or different session signaling protocols. Moreover, this layered approach can maintain the standard SIP transactional model from the point of view of the endpoints, thereby, simplifying inter-working with both dispatch and non-dispatch endpoints and enabling better leveraging of future SIP standards and products.

Architecture 100 may support two types of session setup methods, confirmed and unconfirmed. In an unconfirmed session setup, session notifications to the endpoints are not acknowledged, which provides better scaling for large groups. All unconfirmed session setups may, thus, be automatically accepted by a target terminal without human intervention and without providing the target users an opportunity to decline the session or to indicate which terminal they would like to use. Unconfirmed session setup may be used, for instance, for mission critical group dispatch sessions since these sessions typically need to be active within several hundred milliseconds, and session notifications could then broadcast out to the group.

Confirmed session setup may be used when a response is expected or required from every target user or terminal. This type of session setup may be used, for instance, when a session initiator wants to ensure: that the target endpoints are really in the session; that a session only goes to the terminals where a user is present; or that the target endpoints are ready to receive media. It should be noted that session setup could also be a combination of confirmed and unconfirmed, wherein a majority of session invitations are ideally unconfirmed, and only a few strategic or required users receive confirmed session invitations.

An embodiment of each of the entities illustrated in FIG. 1 is described below, including its functionality. Each entity in architecture 100 and each endpoint may comprise one or more receivers for receiving information in the communications system, one or more transmitters for transmitting information in the communications network, one or more a processor(s) and suitable memory for storing software for execution by the processor(s) to enable the entity or endpoint to perform various functions. Such receivers, transmitters, processors, memory and their functionality are well known in the art and will not be further described here for the sake of brevity.

Each endpoint in the system, e.g., endpoints 140, 142 and 146, comprise a unique user and terminal binding, wherein each terminal may be a dispatch terminal having the minimum capabilities of PTT functionality to enable communication with the floor controller 130, being able to affiliate itself with a group, and being able to exchange media and control (SAP) via IP multicast. By contrast, non-dispatch terminals are unable to perform one or more of the above three functions. The endpoints generally comprise both a SIP User Agent Client (UAC) and a SIP User Agent Server (UAS) to enable the endpoint to interact with the communications system to setup, modify, and take down either group directed or individual directed sessions, wherein a group directed session is an invitation to a group, and an individual directed session in an invitation to at least one individual endpoint, e.g., point-to-point. In order to place or receive calls, an endpoint must first register with the system. Since SIP signaling is generally utilized for all session control signaling, a SIP REGISTER method can be used, wherein all SIP REGISTER requests may be forwarded to the registration manager 102. If the endpoint desires to be member of a group, it may affiliate with that group using an AFFILIATE method wherein all affiliation requests may be forwarded to the group database manager 108.

Endpoints may also be configured for receiving SAP announcements to inform the endpoint of the addition and removal of sessions within the context of a group, and during a session, endpoints may interact directly with the floor controller 130 for the purpose of controlling the source for a particular session's media streams. The protocol used for floor control interaction may specified in the SDP as part of the SIP and SAP session signaling in accordance with embodiments described herein.

Turning to the session controller 106, it maintains the state for all sessions within its domain of control, e.g., there may be multiple session controllers in a multi-zone system, as a function of factors such as system resources, wireless and wireline bandwidth, endpoint resources (e.g., whether an endpoint is currently participating in another session) and capabilities of target endpoints. The session controller 106 may determine whether or not a requested multimedia session can be established, and may work with the bandwidth manager 132 to reserve bandwidth and make the appropriate quality of service (QoS) reservations for a given session. The session controller 106 may also work with the parameter resolver 114 to determine a corresponding set of session parameters usable during an accepted session.

The session controller 106 is generally the one entity in the system with visibility into all sessions and the participants for all of the sessions. Therefore the session controller 106 may, for instance, use information to determine whether critical users are available, and to queue a session if the critical users are not available. In addition, session controller 106 may decide to pull a critical user out of a low priority session to place this user in another higher priority session. Furthermore, the session controller 106 may know, either from the group database manager 108 or the registration manager 102 for instance, how many simultaneous sessions an endpoint can support and therefore whether it can join the session being setup.

Turning to the group entity 110, it may be a specialized SIP entity that combines a SIP UAC, a SIP UAS, and optionally a SAP session directory into a single entity. Its SIP UAC and SIP UAS functionality enables a single point of control for group communications, and the SAP directory functionality enables increased scalability and performance. Each group entity may also be named and addressable at the application layer to enable endpoints to send SIP signaling to a group's associated group entity to set up sessions with the group.

Upon receiving a session request, the group entity 110 may be configured for determining the set of endpoints to pull into a session based on group affiliation information from the group database manager 108, and then for passing any requested session parameters and the capabilities for the group members to the session controller 106 with a request that a session be setup. If the session controller 106 grants the request, the group entity 110 signals the session setup to the affiliated endpoints either through a SIP INVITE message for confirmed session setup or via a session announcement protocol, such as multicast SAP announcements, for unconfirmed session setup.

Turning to the individual proxy 116, it may be a "stateful" SIP proxy that represents the signaling point of control through which the underlying session controller 106 can be accessed when an individual directed session (e.g. point-to-point) is set up between at least two endpoints. Each individual proxy 116 may be instantiated by the individual proxy manager 118 on behalf of the requested session and generally has a life cycle equal to the session. The individual proxy 116 may insert itself into the SIP route set of an individual directed session so that all session control signaling passes through the individual proxy 116 for possible handling by the underlying session controller 106. To the rest of the system and, most importantly, to the endpoints, the SIP signaling looks like it is being sent end to end even though the individual proxy 116 may change the SDP or indicate that a session cannot proceed. This allows adherence to the SIP standard and possibly, better compatibility with standard SIP devices.

In operation, the individual proxy 116 may intercept a SIP INVITE message from an initiating endpoint's UAC and may decide what endpoints to involve in the session based on the destination specified in the INVITE and system policy information. Different policies may specify that a user is called at all of their terminals, called at their mobile terminals, or called at only the terminal specified in the SIP session setup request. Once the list of the endpoints has been selected, the individual proxy 116 may determine a prioritized list of capability usable for the session. This information along with the list of requested session participants may be sent to the session controller 106. If the session is granted, the individual proxy 116 sends the SIP session INVITE messages to all of the intended endpoints, and the session is setup. Moreover, the individual proxy 116 may fill in the SIP FROM header with the address of the session initiator and not its own address so that it is invisible to the endpoints in the session.

As mentioned above, all individual directed session requests are generally intercepted by the individual proxy 116, which interacts with the session controller 106 to determine if the session should be established or denied as a function of factors that include the availability of system resources required to handle the session's traffic, endpoint resources and capabilities, or other parameters such as authentication, authorization, and access policies. The individual proxy 116 passes information on the requested session, as described by the payload of the SIP request, to the session controller 106. This information is usually in the form of a SDP packet, wherein a packet is generally referred to herein as a portion of the SIP request. Through this interaction with the session controller 106, the individual proxy 116 routes the request to the intended recipient endpoint and returns the appropriate response to the session initiator. The interaction between the individual proxy 116 and the session controller 106 can occur through any of a number of conventional mechanisms such as IPC (Inter Process Communications) messaging, RPC messaging, CORBA, RMI, or proprietary inter-process communication means.

If the underlying session controller 106 informs the individual proxy 116 that the session may proceed, e.g., the necessary system resources are available to handle the requested session, the individual proxy 116 may function identically to a normal SIP routing proxy except that it may re-write the SDP to enforce the session controller 106 determination of the updated session parameters (based on available bandwidth, policies, etc.). These updated parameters may be returned to the initiating endpoint and the target endpoint using the normal SIP transactions, so that neither endpoint is aware that a third party has taken control of the session negotiation. If resources are not currently available for the requested session or the session controller 106 has determined that one of the endpoints is currently in another session which cannot be interrupted, the session controller 106 can instruct the individual proxy 116 to respond to the initiating endpoint with the appropriate SIP response to deny or queue the session request.

The session controller 106 can also instruct the individual proxy 116 to terminate the session between the endpoints at any time, independent of any requests from either endpoint if network conditions change during a connection or if either party needs to be pulled into anther session. Individual proxy 116 would then send corresponding SIP BYE requests to each endpoint that would be formatted to appear to be part of the control dialog established between the endpoints.

To perform the above functions, the individual proxy 116 can either be in the session initiator's initial route set, or through standard SIP routing conventions, the proxy can add itself to the dialog's route set through, for instance, the appropriate use of SIP's RECORD-ROUTE header. This enables any future SIP requests from either endpoint to be routed through the individual proxy 116 by use of the complementary SIP ROUTE header. Through this standard mechanism, all future SIP requests that might possibly effect the allocation of network resources can pass through the individual proxy 116 to be examined by the underlying session controller 106.

Turning to the parameter resolver 114, it may be configured for establishing at least one set of communication capabilities that are common to the affiliated endpoints of a given group. These capabilities may include audio codecs, video codecs, screen size, full duplex, support for multicast, etc. Once a set of group capabilities for a given group is resolved, the set may be saved in a database for future use in determining the corresponding session parameters for a session involving that given group.

Turning to the registration manager 102, it may be a modified SIP registry and represents a repository containing information on a user and terminal endpoint and the bindings between them. The registration manager 102 may be configured for registering both dispatch devices and non-dispatch devices. Registration manager 102 may be further configured to perform the standard SIP registry functions, including handling SIP REGISTER requests to register endpoints (a user/terminal binding) on the system. It may also be queried by SIP proxy 104 to determine the possible destinations to which a SIP request is to be routed. For example SIP proxy 104 could supply a user name, and the registration manager 102 could respond with a list of terminal addresses where that user is registered.

In addition to performing the above standard SIP registry functions, the registration manager 102 may also be configured to maintain information describing the media capabilities of each terminal endpoint and, optionally, a user profile. These terminal capabilities may, for instance, be sent in as an extension to the standard REGISTER requests and may describe the attributes of the terminal such as screen size, input/output capabilities, available codecs, etc. The registration manager 102 may also be configured to notify the group database manager 108 of each successful registration or re-registration request that it processes.

Turning to the group database manager 108, it represents a repository containing information on the various group contexts (i.e. group voice, video, and data) that have been provisioned within the system. The group database manager 108 may track group member affiliation for each group in the system and may process AFFILIATE requests from the endpoints to affiliate themselves with one or more groups, so that when one member of the group transmits, all members may receive the media. The group database manager 108 may either allow or disallow the affiliation, based on factors such as: system provisioning of authorization for a particular user to join a particular group; and whether the user's terminals have communication capabilities that are compatible, e.g., can be resolved, with the communication capabilities with any other endpoint already affiliated with the group. The group database manager 108 may also be the keeper of system policies for individual groups, such as their priority, allowable session parameters, session time limits, etc.

Since session parameter resolution is a potentially complex and time-consuming process for a group, the session parameters may be calculated ahead of time. Accordingly, the group database manager 108 may store the valid sets of resolved session parameters for each group, which may be calculated by the parameter resolver. As group members affiliate, the group database manager 108 may update the stored set (or sets) of valid session parameters for the group. Moreover, multiple sets of session parameters may be stored for different categories of usage scenarios. For example, there may be a set specifically for high quality video or a set for audio only.

Turning to the floor controller 130, it may manage access to an associated media stream or streams. The floor controller 130 may process requests for the floor from endpoints and arbitrate to decide which endpoint is allowed to source media on the media channel. The floor controller 130 may perform separate arbitration for each media stream, arbitrating based on rules or policies in the system. When the floor controller 130 grants the floor to a particular endpoint, it may notify the bandwidth manager 132 of the change so that, if required, the bandwidth reservation can be shifted to the new endpoint. If the session is controlled by a hang-time for the media, the floor controller 130 may also notify the session controller 106 of when the hang-time has expired.

Turning to SIP Proxy 104, it may be a standard SIP proxy for directing control and information messages to a target logical entity as a function of the associations maintained by the registration manager 102.

Turning to the group entity manager 112, it may be responsible for creating, maintaining and destroying each group entity 110. It may also be configured as a specialized SIP proxy for routing SIP requests to the proper group entity 110. All requests for the establishment of a new session in a group context may be routed through the group entity manager 112. The group entity manager 112 may instantiate the group entity 110 for a group when a session is set up if the group entity does not exist. Future session setup signaling for that group may be routed to that group entity 110 by the group entity manager 112.

Turning to the individual proxy manager 118, it may be responsible for creating, maintaining and destroying each individual proxy 116. It may also be configured as a specialized SIP proxy for routing SIP requests to the proper individual proxy 116. All requests for the establishment of a new session in an individual, e.g., point-to-point, context may be routed through the individual proxy manager 118. The individual proxy manager 118 may instantiate an individual proxy 116 for an endpoint when a session is setup.

Turning to the multicast address manager 120, it manages a pool of multicast addresses, allocating them on both a semi-permanent and temporary basis. The multicast address manager 120 may have the capability to monitor the type and length of use of allocated addresses in order to determine how, when, and for how long they are used. This enables the manager 120 to reclaim addresses that have not been in use for some time and to prioritize reclamation of addresses that are in use if the pool becomes empty.

Accordingly, the multicast address manager may be configured for performing the following functions: 1) supplying a multicast address from the pool, either temporarily or semi-permanently when requested by an external process; 2) replacing addresses into the pool when returned by an external processes; 3) taking stats on when addresses are used and for what purpose; 4) reclaiming semi-permanent addresses that have been allocated but have been unused beyond some threshold time in order to keep the pool full and minimize router state; 5) in the event that the pool becomes empty, reclaiming addresses that are not being used and have not timed out; 6) in the event that the pool becomes empty, reclaiming addresses that are being actively used based on the priority of the stream, the type of stream, the usage history of the stream, etc.; and 7) consolidating media and control streams that utilize multiple multicast addresses onto a single address. Functions 4-7 may optionally require permission from the system.

Turning to the media manager 126, it may route and/or transform media sourced by the endpoints. For example, an endpoint may transmit its media stream to the media manager, which in turn then broadcasts it to the other endpoints participating in the session. In another example, the endpoint may send high-rate video to the media manager, which may in turn transmit low-rate video to the other endpoints participating in the session.

Turning to the bandwidth manager 132, it may manage the wireline and wireless resources for system 100 that may be used to communicate (e.g., transmit and receive) the media during the various session. For example, a wireless resource may have a given amount of bandwidth. The bandwidth manager may, based upon direction by the session manager as described below, reserve or allocate a portion of that bandwidth to one or more endpoints at a session set-up, so that the endpoints are guaranteed a medium for transmitting media when the endpoints are granted permission to the floor.

Turning finally to the policy manager 124, by the nature of the different ways in which customers are likely to use future multimedia systems, a lot of flexibility may be built into the system. By creating a well-defined and easy to manage set of policies that control system behavior, the customer can tailor the system without the need of special software builds. The policy manager may be configured to control access to a policy database where the various policies are stored.

The following is an example of how communication sessions may be set up in architecture 100. An endpoint 140 sends a SIP INVITE to the application layer router 104 that forwards it to either the group entity manager 112 or the individual proxy manager 118 based on the sub-domain specified in the destination address in the To header of the INVITE. If the group entity manager 112 receives the INVITE, it may instantiate a new group entity 110 for a group if one does not exist. Future session setup signaling for that group may be routed to that group entity 110. If the individual proxy manager 118 receives the INVITE, it may instantiate a new individual proxy 116 for the new individual session.

The individual proxy 116 or group entity 110 may then communicate with the session controller 106 to determine if the session can be setup. Upon acceptance of the session, the session controller notifies the group entity or the individual proxy of the information that it may proceed with the session. In the case of the group entity receiving the information, the group entity generates session signaling to the endpoints that will be involved in the session. Session signaling can take the form of SIP INVITE messages for confirmed group sessions (or individual sessions), or SAP announcements for unconfirmed group sessions. The source indicated in the From header of the INVITE is the group name for group sessions (and is the session initiator for individual sessions). The group members receive the SAP announcements on a multicast channel that has been set up for that group, and group members learn of and join the multicast channel during group affiliation.

Once a session is in place, the endpoint sends floor control signaling to the floor controller 130 to request the floor. The floor controller 130 uses the rules and policies for that session and stream to determine if it should grant the floor. Finally, the session may be modified and terminated upon initiation by one of the endpoints participating in the session or upon initiation by the session controller 106.

Figure 4:
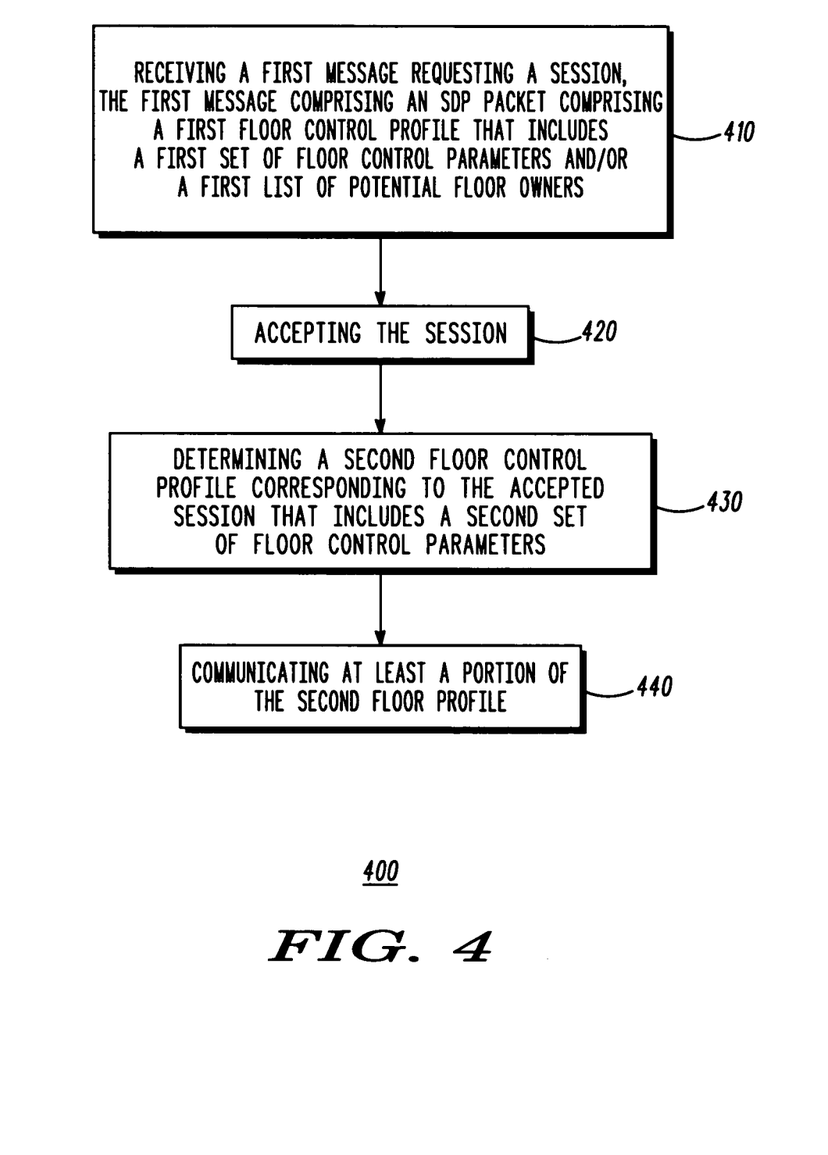
FIG. 4 illustrates a flow diagram of a method for establishing floor control parameters in accordance with embodiments of the present invention.

Turning now to FIG. 4, a flow diagram of a method for enabling floor control in accordance with embodiments of the present invention is shown and generally indicated at 400. Method 400 may, for instance, be performed in the session controller 106, and, more specifically, the steps for performing method may be implemented in software (including firmware) that is stored in memory and executed by one or more processors in the session controller 106. In accordance with embodiments described herein, at step 410 the session controller may receive a message requesting a session for an endpoint. In the case for a request for a group session, the message is received via a group entity 110, and in the case of a request for an individual session, the message is received from an individual proxy 116.

In one embodiment, the message from the endpoint is a SIP INVITE that includes an SDP packet that comprises a requested or proposed floor control profile for the requested session in its payload. However, in other embodiments, the message may be communicated using another suitable transactional protocol and include another suitable communication description protocol packet (comprising the requested floor control profile) without departing from the teachings herein.

The requested floor control profile may include a requested set of one or more floor control parameters or a requested list of one or more potential floor owners or both. Moreover, in one embodiment the requested floor control profile may be characterized by or associated with a predefined name and correspond to a predetermined set of floor control parameters that may be learned by the endpoint using one of a number of ways.

The endpoint may have learned of one or more predefined floor control profiles and corresponding floor control parameters using a suitable off-line procedure. For example, the endpoint may be pre-configured with the one or more predefined floor control profiles and corresponding floor control parameters during manufacturing, or using any suitable wireless or wireline techniques the one or more predefined floor control profiles and corresponding floor control parameters may be subsequently downloaded into the endpoint terminal during its use. In another embodiment, the one or more predefined floor control profiles and corresponding floor control parameters may be learned by an endpoint in a previous session, for example in accordance with embodiments described herein.

Floor control parameters, in general, control when and how a user will be granted the floor, wherein the floor is defined herein as permission to temporarily access or manipulate a specific shared resource or set of resources for sourcing media such as audio, video, etc. The set of floor control parameters (both the requested set and the final set as described below) may include, for instance, one or more of the following: a standard or proprietary floor control protocol that defines a message sequence between the endpoints and the floor controller 130, for instance, for carrying out floor control during a session; a floor control algorithm that may be used by the floor controller 130 for arbitrating floor control during the session, wherein one or more different floor control algorithms may be supported in system 100, which enables differing rules and behaviors for floor assignments; an Internet Protocol (IP) address for the floor controller 130 for use by endpoints during the session to communicate (e.g., by transmitting signaling messages to the floor controller) which enables, for example, the floor controller to be changed for a given session to support for instance load balancing, failure recovery, specific service (e.g., video floor control), etc.; a multicast address for communicating floor control announcements during the session (e.g., by transmitting broadcast messages from the floor controller to the endpoints), such announcements including but not limited to who currently has the floor or that the floor is currently available for use; an indication of a relationship between two or more floors, wherein, for instance, an action with respect to one floor may dictate an action with respect to the related floor(s), for example during one session it may be desired that floor ownership of a video stream follow floor ownership of an audio stream; and a unicast receive port for communicating floor control announcements during the session (e.g., by transmitting a unicast message from the floor controller to an endpoint, for example, for communicating with endpoints that do not support IP multicast capabilities). A unicast receive port is defined herein as a logical endpoint for a connection to enable a device to de-multiplex multiple data flows over one network connection.

A list of potential floor owners (both the requested list and a final list as described below) defines one or more users that may become floor owners (e.g., granted permission to use the floor) to source media during the session. Thus, the list of potential floor owners enables the bandwidth manager to reserve inbound bandwidth or communication resources for only those users on the list, and thereby deny inbound bandwidth to those users included in the session but that are not on the list. In this manner, limited resources can be conserved by not reserving bandwidth at session initiation to those endpoints who will not or cannot (e.g., due to the endpoint's media capabilities) source media during the session. This is advantageous, for example, when the media expected to be sourced during the session has a high bandwidth, e.g., video. Moreover, the inbound bandwidth may be reserved for the entire duration of the session to ensure that each user on the list of potential floor owners will have the needed bandwidth upon the user being granted the floor. The list of potential floor owners may further be based upon user input, may be a pre-defined list or may include one or more reserved symbols (e.g., a wildcard) that can be dynamically resolved to a set of users.

Returning now to the steps of method 400, in step 420 the session controller accepts the session, and in step 430 determines the final floor control profile corresponding to and that will be used during the accepted session. This final floor control profile comprises a final list of potential floor owners and a final set of floor control parameters that at least includes: a floor control protocol; a floor control algorithm; an IP address for the floor controller 130; a multicast address for communicating floor control announcements; and a unicast receive port for communicating floor control announcements. The final floor control profile may be associated with a predefined name and corresponding predetermined parameters. Moreover, the final floor control profile may be the same as or different from the requested floor control profile. If different, the final floor control profile may be generated by modifying the requested floor control profile, or it may be a completely different floor control profile from the requested floor control profile.

For example, in one implementation the session controller may determine that the requested floor control profile does not include a list of potential floor owners and may provide such a list, for instance a predetermined list. In another implementation, one or more of the users on a requested list of potential floor owners may be unavailable to participate in the session or are unauthorized to participate in the session. The session controller 106 may then accordingly modify the list of potential floor control owners to exclude the user(s) from the list. The session controller may likewise add users to the list of potential floor owners, including expanding the list to include all of the session participants.

In another implementation, the message received by the session controller may not include an IP address for the floor controller 130. So, the session controller 106 may provide this IP address. It should be understood by those skilled in the art that in one implementation where the session controller provides an IP address for the floor controller (that is subsequently communicated to the endpoints participating in the session as described below), provision of this IP address may be responsive to a SIP INVITE message comprising an SDP packet that does not include a floor control profile.

In yet another implementation, the requested floor control profile may not include a set of floor control parameters, whereupon a set may be provided by the session controller. In another implementation, the final floor control parameters may be generated by modifying the requested set of floor control parameters or may be a completely different set of floor control parameters from the requested floor control parameters.

Upon determining the final floor control profile, the session controller 106 may communicate (440) the final floor control profile, or a portion thereof. For example, the session controller may communicate the floor control algorithm, floor control protocol, and list of potential floor owners to the floor controller 130 for enabling the floor controller to arbitrate floor control directly with the endpoints during the session. The session controller may communicate the list of potential floor control owners to the bandwidth manager 132 and/or a suitable bandwidth request message for enabling the bandwidth manager to reserve inbound bandwidth for only the potential floor owners on the list, thereby further enabling the bandwidth manager to deny inbound bandwidth to any user that is not included in the final list of potential floor owners.

The session controller may further enable the floor control profile to be communicated to the endpoints participating in the accepted session. When the accepted session is a group session, the session controller may communicate the floor control profile to a group entity 110 that may in turn signal the endpoints in an SDP packet of a SIP or SAP message. When the accepted session is an individual session, the session controller may communicate the floor control profile to an individual proxy 116 that may in turn signal the endpoints in an SDP packet of a SIP message. It should be understood by those skilled in the art that any suitable transactional, broadcast and/or communication description protocol may be used to communicate the floor control profile to the endpoints.

An example SDP containing a floor profile that specifies various floor control parameters along with the floor control IP addressing information is illustrated in Table 1 below.

TABLE 1

| 10  | v=0 |
|-----|-----|
| 20  | o=SL14 1116946156234 0 IN IP4 mmserver |
| 30  | s=multimedia session |
| 40  | c=IN IP4 0.0.0.0 |
| 50  | t=0 0 |
| 60  | m=video 41008 RTP/AVP 34 |
| 70  | c=IN IP4 236.255.254.5 |
| 80  | a=rtpmap:34 H263-2000/90000000 |
| 90  | a=mid:1 |
| 100 | a=X-fcProfile:restricted_video |
| 110 | a=X-fcProtocol:serverBased |
| 120 | a=X-fcType:baton |
| 130 | a=X-fcPFO:sip:don@mot.com,sip:matt@mot.com,sip:ty@mot.com |
| 140 | a=X-fcsAddr:fcServer1@mot.com:9900 |
| 150 | a=X-fccAddr:236.255.1.12:9878 |
| 160 | m=audio 41010 RTP/AVP 99 |
| 170 | c=IN IP4 236.255.254.6 |
| 180 | a=rtpmap:99 X-ULAW/8000 |
| 190 | a=mid:2 |
| 200 | a=X-fcProfile:standard_audio |
| 210 | a=X-fcPFO:sip:mm_group@mot.com |
| 220 | a=X-fcsAddr:fcServer2@mot.com:9900 |
| 230 | a=X-fccAddr:127.0.0.1:42000 |

In this example, there are floor control parameters and IP addressing information for two media streams. The floor control parameters and IP addressing information directed specifically to the first media stream is for a video stream and is described in lines 60-150. The floor control parameters and IP addressing information directed specifically to the second media stream is for an audio stream and is described in lines 160-230. Lines 10-50 describe parameters that apply to both media streams.

The following above fields are used to describe floor control parameters in this floor control profile:

X-fcProfile is the name of the profile, which can be used, for instance, as a short hand to represent a set particular values for the floor profile parameters;

X-fcProtocol is the floor control protocol to use when requesting and receiving floor information for the media stream;

X-fcType is the name for the floor control rules (algorithm) that will be used when arbitrating the floor for that media stream; and X-fcPFO is the list of potential floor owners that are allowed for that stream.

Accordingly, in the first stream, a custom set of floor parameters are assigned to a new profile name "restricted_video". In the second, a known floor profile is specified ("standard_audio"). This profile could identify a particular floor control protocol (e.g., "p2p") and a floor control algorithm (e.g., first-come-first-serve or "fcfs", baton passing, round robin, etc.).

The following above fields are used to describe IP addressing in this floor control profile:

X-fcsAddr is the IP address and port of the floor controller where floor requests are to be directed; and X-fccAddr is the IP address and port where floor control clients should listen for floor announcements, which can be a multicast address to join or a special indicator (ex. the loopback address or 0.0.0.0) that floor announcements are sent unicast so the client could just listen on the supplied port.

Figure 5:
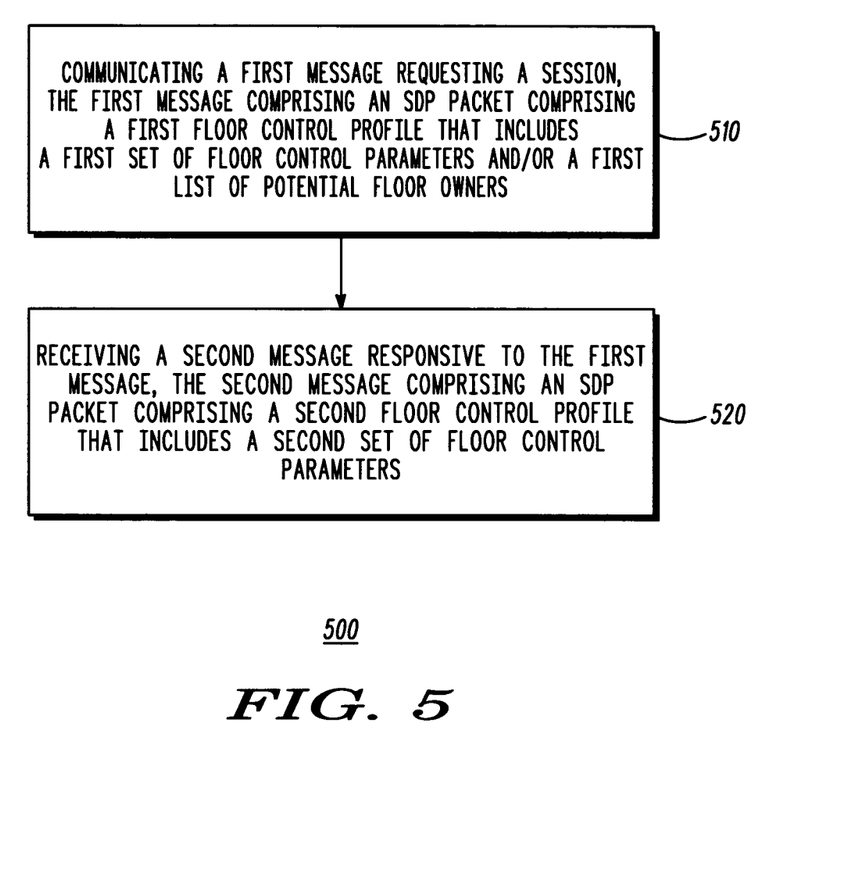
FIG. 5 illustrates a flow diagram of a method for establishing floor control parameters in accordance with embodiments of the present invention.

Turning now to FIG. 5, a flow diagram of a method for enabling floor control in accordance with embodiments of the present invention is shown and generally indicated at 500. Method 500 may, for instance, be performed in an endpoint (e.g., 140, 142, 146), and, more specifically, the steps for performing the method may be implemented in software (including firmware) that is stored in memory and executed by one or more processors in the endpoint. At step 510 the endpoint communicates a message that includes a requested floor control profile as described in detail above. In one embodiment, the message is a SEP INVITE message comprising an SDP packet that comprises the requested floor control protocol although other transactional and/or communication description protocols may be implemented without departing from the teachings herein. At step 520, the endpoint receives a message that includes the final floor control profile corresponding to the accepted session. In one embodiment, the message is a SIP or SAP message comprising an SDP packet that comprises the final floor control profile, although other transactional, broadcast and/or communication description protocols may be implemented without departing from the teachings herein. As stated above, the final floor control profile may comprise one or more of: a floor control protocol, a floor control algorithm, an IP address for a floor controller, a multicast address for communicating floor control announcements, and a unicast receive port for communicating floor control announcements.

Upon receiving the message with the final floor control profile, the endpoint may proceed to extract the final floor control profile and take at least one action based on the extracted floor control profile. These actions include, but are not limited to: enabling a button and/or a switch on the endpoint terminal (or device); disabling a button and/or a switch on the device; enabling one or more indicators on the device; performing the floor control protocol; communicating using the unicast receive port; communicating using the multicast address; and communicating using the IP address for the floor controller.

In the foregoing specification, specific embodiments of the present invention have been described. However, one of ordinary skill in the art appreciates that various modifications and changes can be made without departing from the scope of the present invention as set forth in the claims below. For example, in another embodiment, an endpoint may communicate a message requesting a session, wherein the message does not include a floor control profile, and the endpoint may receive a message in response thereto that comprises a floor control profile as determined by the session controller and that includes at least a set of session control parameters including an IP address for the floor controller. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for enabling floor control in a communication system, the method comprising the steps of:
  receiving a first message requesting initiation of a PTT session, the first message comprising a communication description protocol packet, the communication description protocol packet comprising a first floor control profile, the first floor control profile comprising at least one of a first set of floor control parameters and a first list of potential floor owners;
  accepting the PTT session;
  determining a second floor control profile corresponding to the accepted PTT session prior to the PTT session being established, the second floor control profile comprising a second set of floor control parameters and wherein the second floor control profile is substituted for the first floor control profile as a floor control profile for the PTT session;
  communicating at least a portion of the second floor control profile prior to the PTT session being established; and
  communicating different portions of the second floor control profile to different non-endpoint entities in the communication system and the entire second floor control profile to endpoints participating in the session.

2. The method of claim 1, wherein the first message is received using a transactional protocol and the second floor control profile is communicated in a communication description protocol packet using at least one of the transactional protocol or a broadcast protocol.

3. The method of claim 2, wherein the transactional protocol is a Session Initiation Protocol ("SIP") that includes a Session Description Protocol ("SDP") packet having a payload that contains the first floor control profile for the session, the communication description protocol is a SDP, and the broadcast protocol is a Session Announcement Protocol ("SAP").

4. The method of claim 1, wherein the second floor control profile further comprises a second list of potential floor owners capable of being the same as the first list of potential floor owners, the second list of potential floor owners capable of being different from the first list of potential floor owners.

5. The method of claim 4 further comprising the step of causing communication resources to be reserved at session initiation for each potential floor owner on the second list of potential floor owners.

6. The method of claim 5, wherein communication resources are denied during the accepted PTT session to any user that is not on the second list of potential floor owners.

7. The method of claim 4, wherein the second list of potential floor owners is different from the first list of potential floor owners.

8. The method of claim 1, wherein the second set of floor control parameters further comprises at least one of:
- a floor control protocol,
- a floor control algorithm for arbitrating floor control during the PTT session and enabling differing rules and behaviors for floor assignments,
- an Internet Protocol address for a floor controller for use by the endpoints during the PTT session,
- a multicast address for communicating floor control announcements,
- an indication of a relationship between two or more floors such that an action with respect to one floor is able to dictate an action with respect to one or more related floors, or
- a unicast receive port for communicating floor control announcements during the PTT session.

9. The method of claim 1, wherein if the first and second floor control profiles are different, determining the second floor control profile comprises at least one of:
- providing a predetermined list of potential floor owners in the second floor control profile if the first floor control profile does not include the first list of potential floor owners,
- modifying the first list of potential floor owners if one or more of the users on the first list of potential floor owners are unavailable or unauthorized to participate in the session,
- adding an IP address of a floor controller if the floor control parameters do not include the IP address, or
- providing a second set of floor control parameters if the first floor control profile does not include the first set of floor control parameters.

10. The method of claim 1, wherein communicating different portions of the second floor control profile to different non-endpoint entities comprises communicating a floor control algorithm, a floor control protocol, and the first list of potential floor owners to a floor controller, thereby enabling the floor controller to arbitrate floor control directly with the endpoints during the session.

11. The method of claim 1, further comprising:
- establishing a set of communication capabilities common to endpoints of the PTT session; and
- saving the set of common communication capabilities in a database for use in determining session parameters for a future PTT session involving the endpoints.

12. The method of claim 1, further comprising:
- determining whether critical users are available and queuing the PTT session if the critical users are not available;
- pulling a particular critical user out of a low priority PTT session to place the particular critical user in a higher priority PTT session; and
- determining how many simultaneous PTT sessions an endpoint can support and whether the endpoint can join the PTT session.

13. The method of claim 1, wherein the second set of floor control parameters further comprises:
- a floor control protocol,
- a floor control algorithm for arbitrating floor control during the PTT session and enabling differing rules and behaviors for floor assignments,
- an Internet Protocol address for a floor controller for use by the endpoints during the PTT session,
- a multicast address for communicating floor control announcements, and
- a unicast receive port for communicating floor control announcements during the PTT session.

14. The method of claim 1, wherein the second floor control profile is capable of being the same as the first floor control profile and is capable of being different than the first floor control profile.

15. Apparatus for enabling floor control in a communications system, comprising:
- at least one processor; and
- a memory storing instructions executable by the at least one processor, the instructions comprising the steps of:
  - receiving a first message requesting initiation of a PTT session, the first message comprising a communication description protocol packet, the communication description protocol packet comprising a first floor control profile, the first floor control profile comprising at least one of a first set of floor control parameters and a first list of potential floor owners;
  - accepting the PTT session;
  - determining a second floor control profile corresponding to the accepted PTT session prior to the PTT session being established, the second floor control profile comprising a second set of floor control parameters and wherein the second floor control profile is substituted for the first floor control profile as a floor control profile for the PTT session;
  - communicating at least a portion of the second floor control profile prior to the PTT session being established; and
  - communicating different portions of the second floor control profile to different non-endpoint entities in the communication system and the entire second floor control profile to endpoints participating in the session.

16. A method for enabling floor control in a communication system, the method comprising the steps of:
- communicating a first message requesting initiation of a PTT session, the first message comprising a communication description protocol packet, the communication description protocol packet comprising a first floor control profile, the first floor control profile comprising at least one of a first set of floor control parameters and a first list of potential floor owners;
- receiving prior to the PTT session being established a second message responsive to the first message, the second message comprising a communication description protocol packet, the communication description protocol packet comprising a second floor control profile, the second floor control profile comprising a second set of floor control parameters and wherein the second floor control profile is substituted for the first floor control profile as a floor control profile for the PTT session; and
- communicating different portions of the second floor control profile to different non-endpoint entities in the communication system and the entire second floor control profile to endpoints participating in the session.

17. The method of claim 16, wherein at least one of the first and the second floor control profile is associated with a predefined name corresponding to a predetermined set of floor control parameters, and the predefined name and predetermined set of floor control parameters is learned using an off-line procedure or learned during a previous PTT session and recalled.

18. The method of claim 16, wherein the second set of floor control parameters comprises at least one of:
- a floor control protocol,
- a floor control algorithm,
- an Internet Protocol address for a floor controller for use by the endpoints during the session, a multicast address for communicating floor control announcements, an indication of a relationship between two or more floors such that an action with respect to one floor is able to dictate an action with respect to one or more related floors, or a unicast receive port for communicating floor control announcements during the PTT session, the method further comprising the steps of:

extracting the second floor control profile from the second message; and taking at least one action based on the extracted second floor control profile.

19. The method of claim 18, wherein the at least one action comprises at least one of:

enabling at least one of a button and a switch on a device;
disabling at least one of a button and a switch on the device;
enabling at least one indicator on the device;
performing the floor control protocol;
communicating using the unicast receive port;
communicating using the multicast address; or
communicating using the IP address.

\* \* \* \* \*